(12) United States Patent
Lee et al.

(10) Patent No.: US 9,358,857 B2
(45) Date of Patent: Jun. 7, 2016

(54) INFRARED SENSOR ASSEMBLY FOR MEASURING TEMPERATURE INSIDE VEHICLE

(71) Applicant: Halla Visteon Climate Control Corp., Daejeon (KR)

(72) Inventors: Jeong Hoon Lee, Daejeon (KR); Seung Cheol Song, Daejeon (KR); Chang Hyu Baek, Daejeon (KR)

(73) Assignee: Hanon Systems, Daejeon-si (KR)

( * ) Notice: Subject to any disclaimer, the term of this patent is extended or adjusted under 35 U.S.C. 154(b) by 0 days.

(21) Appl. No.: 14/411,240

(22) PCT Filed: Jun. 26, 2013

(86) PCT No.: PCT/KR2013/005648
§ 371 (c)(1),
(2) Date: Dec. 24, 2014

(87) PCT Pub. No.: WO2014/003435
PCT Pub. Date: Jan. 3, 2014

(65) Prior Publication Data
US 2015/0139271 A1    May 21, 2015

(30) Foreign Application Priority Data

Jun. 26, 2012 (KR) .......... 10-2012-0068621
Jun. 26, 2013 (KR) .......... 10-2013-0073418

(51) Int. Cl.
*B60H 1/00*        (2006.01)
*B60R 13/02*       (2006.01)
(Continued)

(52) U.S. Cl.
CPC ........ *B60H 1/00792* (2013.01); *B60H 1/00807* (2013.01); *B60R 13/025* (2013.01); *G01J 5/0215* (2013.01); *G01J 5/04* (2013.01); *G01J 5/0893* (2013.01); *B60R 2013/0287* (2013.01)

(58) Field of Classification Search
CPC ........... B60H 1/00642; B60H 1/00792; B60H 1/00742; B60H 1/00807; G01J 5/04; G01J 5/041; B60R 13/02; B60R 13/025; B60R 13/0237; B60R 2013/0287
USPC ...................... 374/121, 120, 208, 210, E1.018
See application file for complete search history.

(56) References Cited

U.S. PATENT DOCUMENTS 6,227,501 B1 *  5/2001  Malcolm ............... B60R 19/483
                                              73/866.5
6,396,163 B1 *  5/2002  Sugiura ................. B66F 9/0755
                                              307/10.1

(Continued)

FOREIGN PATENT DOCUMENTS

JP        11-201822 A    7/1999
JP     2000-094923 A    4/2000

(Continued)

*Primary Examiner* — Lisa Caputo
*Assistant Examiner* — Philip Cotey
(74) *Attorney, Agent, or Firm* — Fraser Clemens Martin & Miller LLC; James D. Miller

(57) ABSTRACT

The present invention relates to an infrared sensor assembly for measuring temperature in a vehicle, including: a support bracket 3 configured to be detachably coupled with an inner surface of a garnish on one side inside the vehicle to form a base; a casing 5 configured to be detachably coupled on the support bracket 3 and form an inner installation space between the support bracket 3 and the casing 5; a main PCB 7 configured to be inserted into a PCB housing 17 so as to be interposed between the support bracket 3 and the casing 5; and an infrared sensor 9 configured to be inclinedly bound with the main PCB 7 to measure the temperature in the vehicle. By this configuration, the overall size of the infrared sensor assembly may be compacted, the infrared sensor assembly may be easily commonly used in different types of vehicles, and the infrared sensor assembly may be embedded in a garnish of an interior material, such as an A-pillar to improve an aesthetic of the interior of the vehicle.

16 Claims, 10 Drawing Sheets

(51) Int. Cl.
*G01J 5/02* (2006.01)
*G01J 5/04* (2006.01)
*G01J 5/08* (2006.01)

(56) References Cited

U.S. PATENT DOCUMENTS

| | | | | |
|---|---|---|---|---|
| 2002/0069700 | A1* | 6/2002 | Dirmeyer | G01L 19/14 73/866.5 |
| 2002/0101694 | A1* | 8/2002 | O'Connor | B60R 11/02 361/63 |
| 2004/0163936 | A1* | 8/2004 | Clegg | H01H 13/70 200/5 A |
| 2005/0103876 | A1* | 5/2005 | Martinez | B60H 1/00742 374/E13.006 |
| 2005/0211903 | A1* | 9/2005 | Harter | B60Q 9/008 250/353 |
| 2007/0114292 | A1* | 5/2007 | Breed | B60H 1/00742 236/49.3 |
| 2009/0200777 | A1* | 8/2009 | Webber | B60R 21/26 280/736 |
| 2010/0044528 | A1* | 2/2010 | Jimenez | B60R 11/00 248/74.1 |
| 2010/0272300 | A1* | 10/2010 | Schlitt | B60R 1/12 224/282 |
| 2011/0126470 | A1* | 6/2011 | Higgins | B60R 16/0215 174/72 A |

FOREIGN PATENT DOCUMENTS

| | | |
|---|---|---|
| JP | 2000139027 A | 5/2000 |
| JP | 2002233527 A | 8/2002 |
| JP | 2002316525 A | 10/2002 |
| JP | 2005-037239 A | 2/2005 |
| KR | 200382407 Y1 | 4/2005 |
| KR | 1020120038572 A | 4/2012 |

* cited by examiner

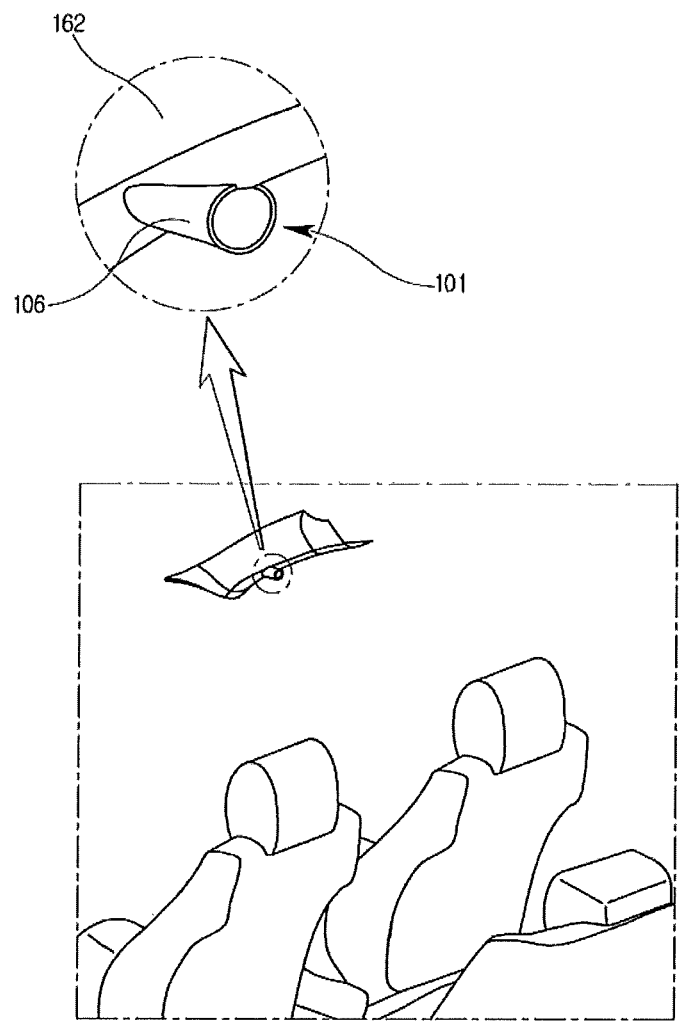
FIG. 1 – PRIOR ART
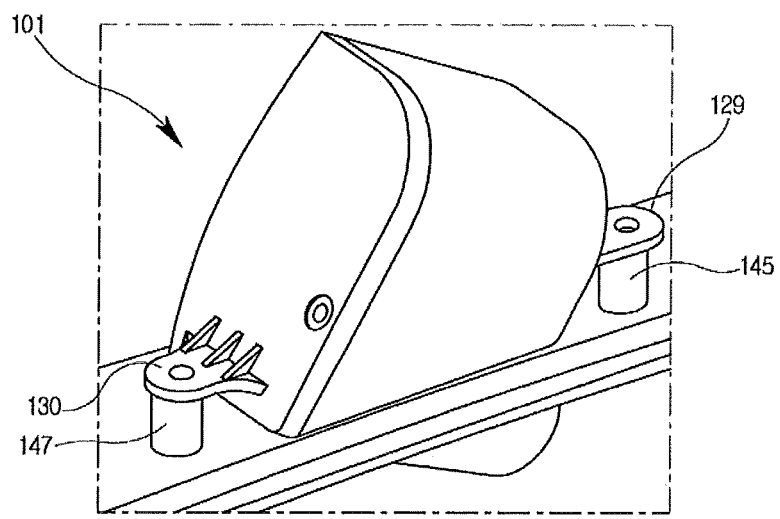
FIG. 2 – PRIOR ART

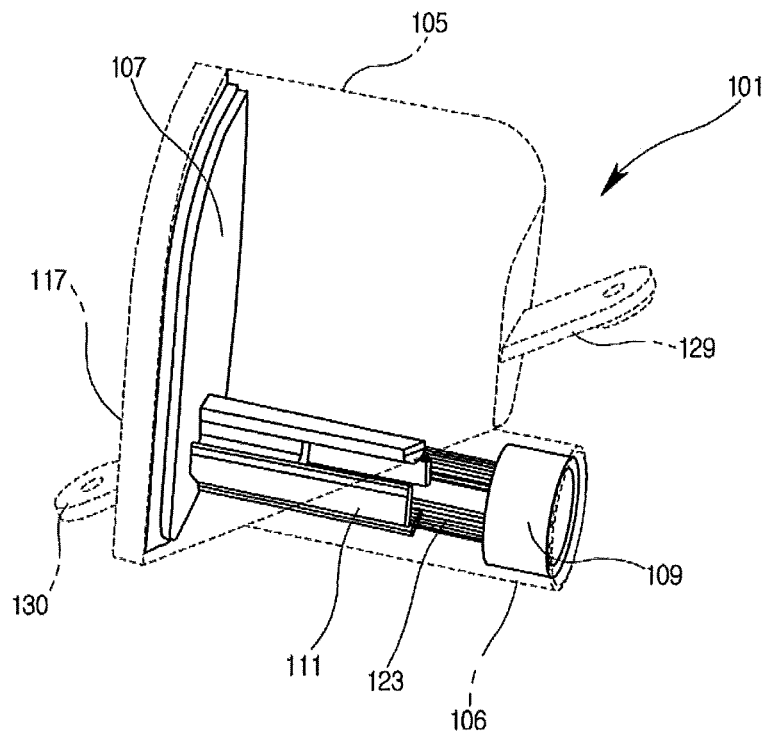
FIG. 3 – PRIOR ART
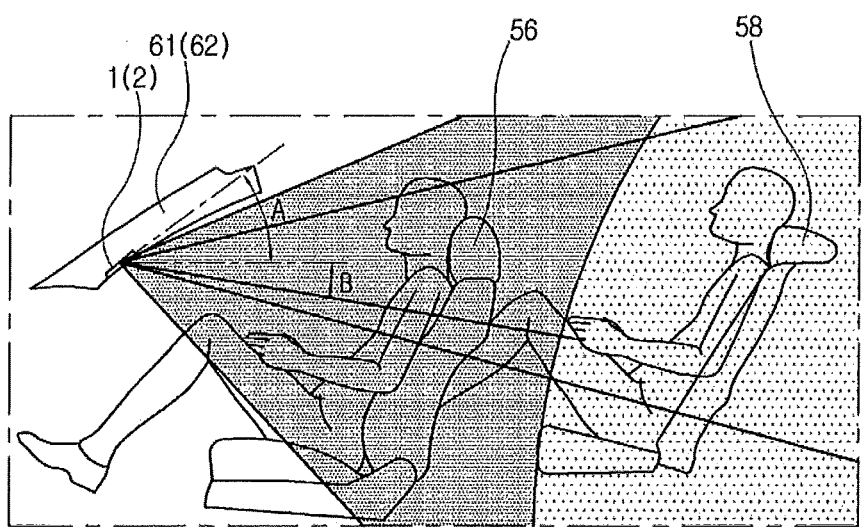
FIG. 4

INFRARED SENSOR ASSEMBLY FOR MEASURING TEMPERATURE INSIDE VEHICLE

CROSS-REFERENCE(S) TO RELATED APPLICATIONS

This application is a United States national phase application based on PCT/KR2013/005648 filed Jun. 26, 2013, which claims the benefit of each of Korean Patent Application No. 10-2012-0068621 filed Jun. 26, 2012 and Korean Patent Application No. 10-2013-0073418 filed Jun. 26, 2013. The disclosures of the above applications are hereby incorporated herein by reference in their entirety.

BACKGROUND OF THE INVENTION

1. Field of the Invention

Exemplary embodiments of the present invention relate to an infrared sensor assembly, and more particularly, to an infrared sensor assembly for measuring temperature in a vehicle which is equipped in a garnish of a vehicle interior material such as A-pillar to be useful for measurement of the temperature in the vehicle without spoiling an aesthetic of an interior of the vehicle and have excellent replacement adaptability for a change in a vehicle model.

2. Description of Related Art

To optimize air conditioning for an interior space of a vehicle, in particular, cooling, first of all, a temperature of an interior space needs to be accurately measured.

For this purpose, a contactless temperature measuring method using an infrared sensor has been most widely used. According to the method, an infrared sensor which is installed in the vehicle measures a temperature around a passenger's face by a contactless manner and as the measured result, the air conditioning for the interior space of the vehicle, in particular, a cooling state may be controlled.

To measure the temperature in the vehicle according to the non-contactless type temperature measuring method, an infrared sensor assembly needs to be installed at a proper place in the vehicle. An example of the infrared sensor assembly is illustrated in FIGS. 1 to 3.

The infrared sensor assembly as represented by reference numeral 101 in FIGS. 1 to 3 is installed at a front edge portion in the vehicle such as an A-pillar 162, and therefore is configured to include a casing 105, a main PCB 107, an infrared sensor 109, a warpage prevention bracket 111, and a PCB housing 117.

Here, the casing 105 is an outer body forming a front surface of the infrared sensor assembly 101. As illustrated in FIG. 2, since the casing 105 is inclinedly equipped in the garnish of the A-pillar 162, a fixed tip 129 protrudes over a front surface of the casing 105 to be detachably coupled with a front boss 145 which protrudes at an inner side of the garnish by a screw, and the like. Further, an induction pipe 162 extends to a lower end of a front surface of the casing 105 and thus is inserted with the infrared sensor 109 which protrudes forward, while being vertically bound with the main PCB 107.

Further, the main PCB 107 is an element in which the infrared sensor 109 and other control circuits or elements are mounted and as illustrated in FIG. 3, is inserted into a PCB housing 117 which is inserted into an opened side of a rear end of the casing 105.

Further, the infrared sensor 109 is a core member of the infrared sensor assembly 101 for measuring a temperature in a vehicle and as illustrated in FIG. 3, is vertically bound with the main PCB 107 which is mounted at a rear end of the casing 105 and therefore protrudes more forward than the casing 105 along the induction pipe 106.

Further, the warpage prevention bracket 111 is a means for protecting the infrared sensor 109 which is bound on the main PCB 107 and as illustrated in FIG. 3, is vertically attached on the main PCB 107 to serve to enclose and protect a terminal 123 of the infrared sensor 109 which is vertically bound with the main PCB 107.

Consequently, the PCB housing 117 is a portion to fix the infrared sensor assembly 101 inside the garnish of the A-pillar 162 on the rear surface of the casing 105, while supporting the main PCB 107 and as illustrated in FIGS. 2 and 3, has a predetermined thickness or more to receive the main PCB 107 and is detachably coupled with a rear boss 147 protruding in an inner side of the garnish by the fixed tip 130 protruding backward from an opposite side of the fixed tip 120 of the casing 105.

However, in the typical infrared sensor assembly 101 configured as described above, the infrared sensor 109 measuring the temperature in the vehicle and the warpage prevention bracket 111 supporting the infrared sensor 109 are vertically bound on the main PCB 107 as illustrated in FIG. 3, and therefore the overall size of the infrared sensor assembly 101 in addition to the casing 105 is large and thus the infrared sensor assembly 101 is very difficult to be mounted at a position at which the internal garnish like the A-pillar 162 is narrow.

In particular, when the casing 105 is inclinedly disposed to fit a photographing angle of the infrared sensor 109, the induction pipe 106 guiding the infrared sensor 109 inevitably protrudes outside the casing 105 and thus is exposed outside the A-filler 162, such that an aesthetic of the interior of the vehicle may be spoiled.

Further, to fit a dimension or a shape of the garnish which is changed depending on each vehicle model and fit the photographing angle or a height of the infrared sensor 109, mounting portions of the casing 105 and the PCB housing 117 are differently designed and therefore the design or the manufacturing efficiency of the infrared sensor assembly may be degraded.

SUMMARY OF THE INVENTION

An embodiment of the present invention is directed to an infrared sensor assembly for measuring temperature in a vehicle capable of more facilitating commonness of an infrared sensor assembly and prevent an aesthetic of an interior of a vehicle from degrading due to an infrared sensor by compacting an assembling structure of the infrared sensor of an infrared sensor assembly which is mounted in a front surface in the vehicle, in particular, an A-pillar portion.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an infrared sensor assembly for measuring temperature in a vehicle includes: a support means configured to be installed in a garnish of one side in the vehicle; and a commonness means configured to be installed in the support means so as to control an installation angle of an infrared sensor for measuring the temperature in the vehicle.

Further, the support means may be a support bracket which is installed in an A-pillar in the vehicle and the commonness means may include a casing configured to be mounted in the support bracket and form an internal installation space between the casing and the support bracket and a main PCB configured to be inserted into a PCB housing to be interposed between the support bracket and the casing.

Further, the commonness means may further include a warpage prevention bracket of the infrared sensor which is inclinedly attached to the main PCB to inclinedly bind the infrared sensor for measuring the temperature in the vehicle with the main PCB.

Further, the warpage prevention bracket of the infrared sensor may have a binding angle to the main PCB which is changed depending on an installation angle of the support bracket and a photographing angle of the infrared sensor.

Further, the support bracket may be detachably installed with the A-pillar in the vehicle.

Further, the casing may have an infrared transmitting window provided on one side of a front surface thereof.

Further, the support bracket may be installed at a lower end of the A-pillar.

Further, an inside of the warpage prevention bracket of the infrared sensor may be formed to enclose a terminal of the infrared sensor to prevent the terminal of the infrared sensor from being warped.

Further, the infrared sensor assembly may further include a cover configured to be detachably mounted in the support bracket from an outer side of the casing, having the casing therebetween, have an exposure hole coupled with the infrared transmitting window penetrating through one side thereof, and be curved to have a profile of an outer surface fitted for that of an exterior surface of the garnish.

Further, the support means may be an installation groove formed in the A-pillar in the vehicle, and the commonness means may be mounted in the installation groove and may include a cap casing configured to include an angle control mechanism installed to control an angle of the infrared sensor and a sensor fixture configured to receive and fix the infrared sensor so that the infrared sensor is indirectly installed in the angle control mechanism and be installed in the angle control mechanism at various angles.

Further, the angle control mechanism may include a pipe-shaped receiving body configured to form a receiving groove in which the sensor fixture is received and at least two angle control screws configured to penetrate from an outer side of the receiving body toward an inner side thereof to fix the sensor fixture received in the receiving groove at various angles.

Further, the receiving groove may have a circular groove shape, the angle control screws may be disposed at a circumference of the receiving body at an equal interval along a circumferential direction and disposed in pair in a direction opposite to each other, and the angle control screws each formed in pair may be disposed to be spaced apart from each other at a predetermined distance along a length direction of the receiving body.

Further, an outer circumference of the sensor fixture may be provided with an installation direction fixing protrusion to confirm an installation direction following the circumferential direction of the receiving groove when the sensor fixture is received in the receiving groove and the receiving groove may be provided with an installation direction fixing groove corresponding to the installation direction fixing protrusion.

Further, the installation groove may be installed at a lower end of the A-pillar.

Further, the infrared sensor assembly may further include a receiving body cover configured to cover the receiving groove of the receiving body and have a central portion provided with a through hole through which a portion of the infrared sensor indirectly installed in the receiving body penetrates by the sensor fixture.

The receiving body cover may be provided with a cut part configured to communicate with the through hole so as to secure a smooth motion of the infrared sensor penetrating through the through hole at the time of installing the infrared sensor.

According to the infrared sensor assembly for measuring temperature in a vehicle in accordance with the exemplary embodiments of the present invention, it is possible to compact the overall size of the infrared sensor assembly by inclinedly binding the infrared sensor assembly for measuring temperature in a vehicle on the main PCB together with the warpage prevention bracket.

Therefore, it is possible to more improve the aesthetic of the interior of the vehicle since the infrared sensor may be embedded in the garnish of the interior material of the vehicle such as the A-pillar.

Further, it is possible to maintain the optimal temperature measuring performance by adjusting the length or the width of the support bracket depending on the internal structure of the garnish in the vehicle such as the A-pillar and change the binding angle of the infrared sensor and changing the binding angle of the infrared sensor depending on the photographing angle of the infrared sensor even though the vehicle model to which the infrared sensor assembly is applied is changed, and at the same time, promote the smooth commonness of the infrared sensor assembly only by performing the adjustment to make the profile of the outer surface of the cover coincide with the embedded plane profile of the corresponding interior material such as the A-pillar.

According to the infrared sensor assembly for measuring temperature in a vehicle in accordance with the exemplary embodiments of the present invention, it is possible to compact the overall size of the infrared sensor assembly since the infrared sensor assembly for measuring temperature in a vehicle is installed in the cap casing at various angles by the plurality of angle control screws and the cap casing is installed in the installation groove formed the A-pillar.

Therefore, it is possible to more improve the aesthetic of the interior of the vehicle since the infrared sensor may be embedded in the garnish of the interior material of the vehicle such as the A-pillar.

Further, it is possible to maintain the optimal temperature measuring performance and promote the smooth commonness of the infrared sensor assembly by changing the binding angle of the infrared sensor even though the vehicle model to which the infrared sensor assembly is applied and thus the angle of the A-pillar is changed.

BRIEF DESCRIPTION OF THE DRAWINGS

FIG. 1 is a partially extracted perspective view of a typical infrared sensor assembly applied to an interior of a vehicle.

FIG. 2 is an enlarged perspective view of the infrared sensor assembly illustrated in FIG. 1.

FIG. 3 is a perspective view illustrating an internal structure of the infrared sensor assembly illustrated in FIG. 2.

FIG. 4 is a cut perspective view of an interior of a vehicle to which an infrared sensor assembly according to an exemplary embodiment of the present invention is applied.

DESCRIPTION OF SPECIFIC EMBODIMENTS

Hereinafter, embodiments of the present invention will be described in detail with reference to the accompanying drawings and these embodiments may be implemented in various forms by a person having ordinary skill in the art to which the present invention pertains and therefore the present invention is not limited to the embodiments described herein.

Hereinafter, an infrared sensor assembly for measuring temperature in a vehicle according to exemplary embodiments of the present invention will be described with reference to the accompanying drawings.

An infrared sensor assembly for measuring temperature in a vehicle according to an exemplary embodiment of the present invention includes: a support means configured to be installed in a garnish of one side in the vehicle; a commonness means configured to control an installation angle of an infrared sensor for measuring the temperature in the vehicle.

Hereinafter, the infrared sensor assembly for measuring temperature in a vehicle according to the exemplary embodiment of the present invention will be described with reference to FIGS. 4 to 8. According to the infrared sensor assembly for measuring temperature in a vehicle in accordance with the exemplary embodiment of the present invention, as the support means, a support bracket 3 which is installed in A-pillars 61 and 62 in a vehicle is applied and the commonness means includes is a casing 5 which is mounted in the support bracket 3 and forms an internal installation space between the casing 5 and the support bracket 3 and a main PCB 7 which is inserted into a PCB housing 17 so as to be interposed between the support bracket 3 and the casing 5.

Figure 5:
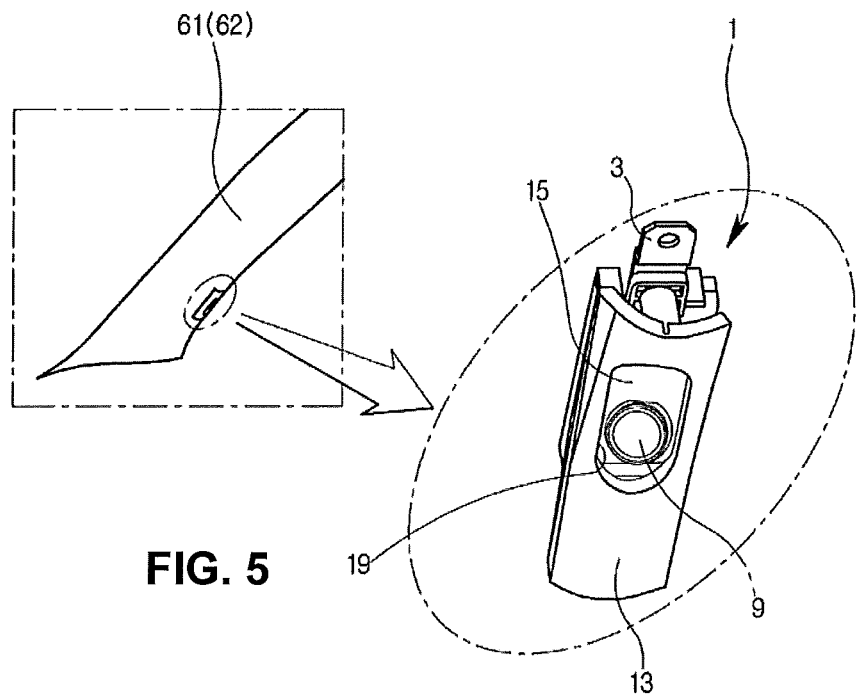
FIG. 5 is an enlarged perspective view of the infrared sensor assembly illustrated in FIG. 4.

The infrared sensor assembly according to the exemplary embodiment of the present invention is configured to be installed at one side of various garnishes forming an interior of the vehicle to measure the temperature in the vehicle and for example, as represented by reference numeral 1 in FIGS. 4 and 5, may be installed in the left and right A-pillars 61 and 62 which are positioned at left and right corners of a front surface in the vehicle. This is to keep the infrared sensor assembly 1 far away from a passenger which is a temperature measuring target if possible. As such, the reason for keeping an interval between the infrared sensor assembly 1 and the passenger far away from each other is to secure a photographing range as wide as possible only by an infrared sensor using a narrow angle lens which is cheap but has a narrow viewing angle.

Figure 6:
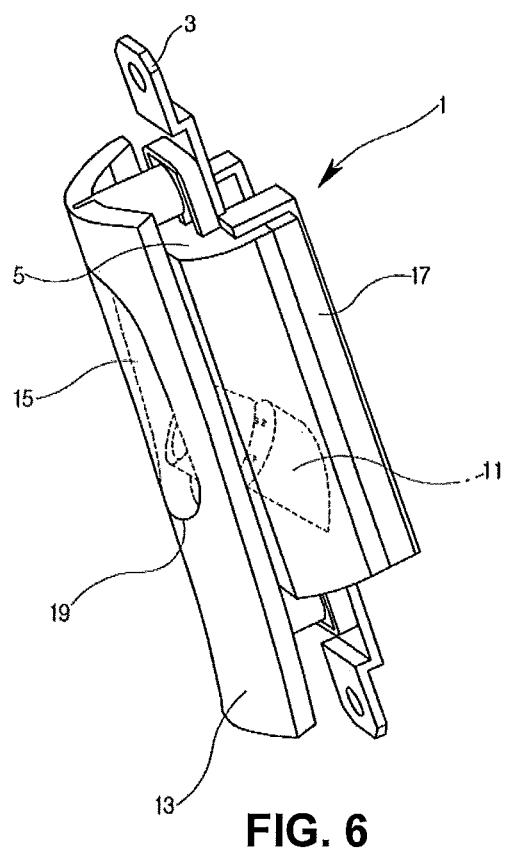
FIG. 6 is a rear perspective view of the infrared sensor assembly illustrated in FIG. 5.

As illustrated in FIGS. 5 and 6, an infrared sensor assembly 1 according to an exemplary embodiment of the present invention which is installed at a front surface in a vehicle to measure temperature in a vehicle is configured to include the support bracket 3, the casing 5, the main PCB 7, and the infrared sensor 9, and preferably, is configured to further include an infrared sensor warpage prevention bracket 11 and a cover 13.

Here, the support bracket 3 is a base to make the infrared sensor assembly 1 detachably be mounted on an inner surface of the garnish in the vehicle and as illustrated in FIG. 5, may help mount the infrared sensor assembly 1 at a desired position independent of a shape or a dimension of an inside of the corresponding garnish, that is, the garnish of the A-pillars 61 and 62 as illustrated.

Meanwhile, a viewing angle of the infrared sensor 9 is widened as the infrared sensor 9 is positioned at lower ends of the A-pillars 61 and 62 within the limited space of the vehicle. Therefore, in order to widen the viewing angle of the infrared sensor 9 if possible, the support bracket 3 may be installed at the lower ends of the A-pillars 61 and 62.

Figure 7:
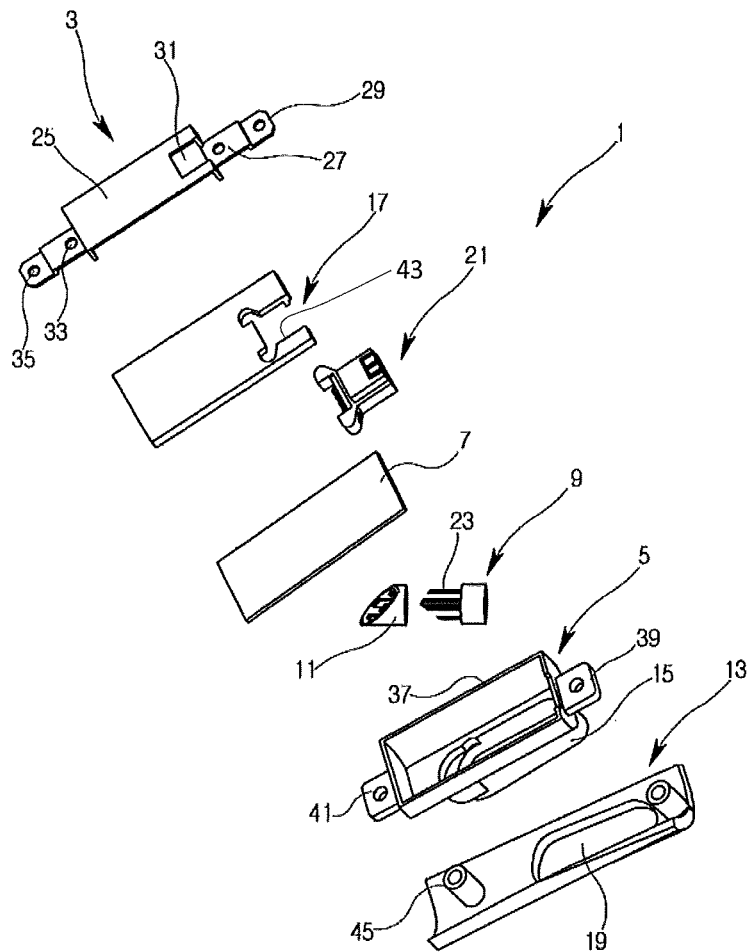
FIG. 7 is an exploded perspective view of the infrared sensor assembly illustrated in FIG. 4.

To this end, as illustrated in FIGS. 5 to 7, the support bracket 3 is configured to include a central substrate 25 which lengthily extends up and down, supports 27 which extends in parallel with each other, being bent at upper and lower ends of the substrate 25 at a right angle, and fixed tips 29 which are again bent at ends of each of the upper and lower supports 27 at a right angle to extend in parallel with the substrate 25 or the supports 27, in which the upper end of the substrate 25 is provided with a cut-away drawing-in hole 31 through which a connector 21 is exposed upward, a screw hole 33 which screw-connects between the casing 5 and the cover 13 is provided on the support 27, and screw holes 35 each penetrates through the fixed tips 29, penetrating through the fixed tips 29 to screw-connect the support bracket 3 itself to, for example, an inner surface of the garnish of the A-pillars 61 and 62.

The casing 5 is an outer body of the infrared sensor assembly 1 enclosing the infrared sensor 9 and as illustrated in FIGS. 6 and 7, is configured to include a semi-cylindrical body 37 which forms an inner space between the casing 5 and the support bracket 3 to receive the infrared sensor 9 and the warpage prevention bracket 11 and a transmission window 15 radially protruding to lengthily extend from an upper end of an outer surface of the body to a middle-lower end thereof. In this case, as illustrated, the penetrating fixed tips 39 are protrudedly provided at upper and lower ends of the body 37, in which the screw holes 41 penetrate through the fixed tips 39 to detachably screw-connect the casing 5 to the support bracket 3. Further, the transmission window 15 radially protrudes from one side of the front surface of the casing 5 to protect the infrared sensor 9 and is made of a material which may normally transmit infrared rays radiated from a heating element such as a passenger to reach the infrared sensor 9.

The main PCB 7 is a part in which various control circuits or elements of the infrared sensor 9 and the infrared sensor 9 are mounted and as illustrated in FIGS. 6 and 7, is inserted into the PCB housing 17 to be interposed between the support bracket 3 and the casing 5, seated on the substrate 25 of the support bracket 3 through the PCB housing 17, and exposed to the inner space of the casing 5. In this case, the main PCB 7 is connected to an external line through the connector 21 connected to one end thereof and the upper end of the PCB housing 17 is provided with a cut-away part 43 having the same shape as the connector 21 to insert the connector 21.

The infrared sensor 9 is a core means of the infrared sensor assembly 1 which measures a thermal image of the interior of the vehicle to provide temperature information and as illustrated in FIGS. 5 to 7, is inclinedly bound on the main PCB 7. According to the exemplary embodiment of the present invention, as described above, as the infrared sensor 9, a sensor which includes a narrow angle lens having a viewing angle of 60° may be used.

The warpage prevention bracket 11 of the infrared sensor is a support means to inclinedly bind the infrared sensor 9 to the main PCB 7 as described above or protect the infrared sensor 9 which is inclinedly mounted on the main PCB 7 and as illustrated in FIGS. 6 and 7, the warpage prevention bracket 11 is a short cylindrical body of which the bottom surface is inclinedly formed. As such, due to the inclined bottom surface, the warpage prevention bracket protects a terminal 23 of the infrared sensor 9, being inclinedly attached to the main PCB 7 due to the inclined bottom surface.

Figure 8:
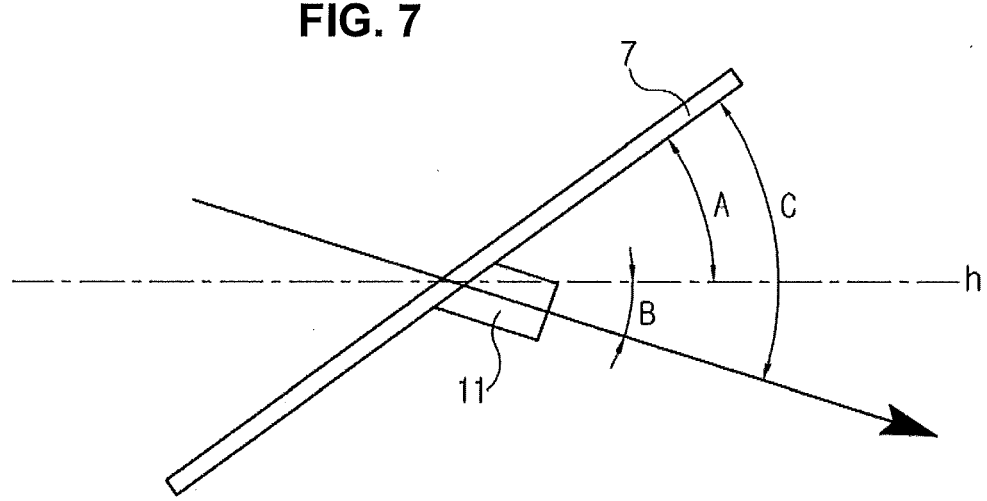
FIG. 8 is a diagram illustrating a relationship among a photographing angle of an infrared sensor of the infrared sensor assembly according to the exemplary embodiment of the present invention, an installation angle of a support bracket, and a binding angle of the infrared sensor.

In this case, the warpage prevention bracket 11 of the infrared sensor determines the binding angle of the main PCB 7 in consideration of the photographing angle of the infrared sensor 9 and the installation angle of the support bracket 3 and as illustrated in FIG. 8, a binding angle C of the main PCB 7 of the warpage prevention bracket 11 is an angle formed by the main PCB 7 and the warpage prevention bracket 11 and is obtained by adding an installation angle A of the main PCB 7, that is, the support bracket 3 to an inclined angle of the infrared sensor 9 with respect to a photographing angle B of the infrared sensor 9, that is, a horizon h. Therefore, the binding angle of the warpage prevention bracket 11 to the main PCB 7 is changed depending on an installation height of the support bracket 3 which determines the installation angle of the support bracket 3 as well as the photographing angle of the infrared sensor 9.

Further, the cover 13 is an exterior member which hides the infrared sensor assembly 1 into the garnish and as illustrated in FIGS. 5 to 7, is formed of a board which lengthily extends to cover the front portion of the casing 5 and is configured to insert bosses 45 protruding from upper and lower portions of an inner side thereof into the screw hole 33 of the support bracket 3 so as to provide the screw-connection of a screw which penetrates through the screw hole 41 of the casing 5 so that the cover 13 is detachably mounted in the support bracket 3, having the casing 5 therebetween.

Further, the cover 13 has one side of the front surface lengthily provided with the exposure hole 19 up and down so that the cover 13 is coupled with the infrared transmission window 15. In this case, the profile of the outer surface may be curved at a curvature which meets the profile of the exterior surface of the garnish of the A-pillar.

Hereinafter, an operation of the infrared sensor assembly according to the exemplary embodiment of the present invention configured as described above will be described.

Figure 9:
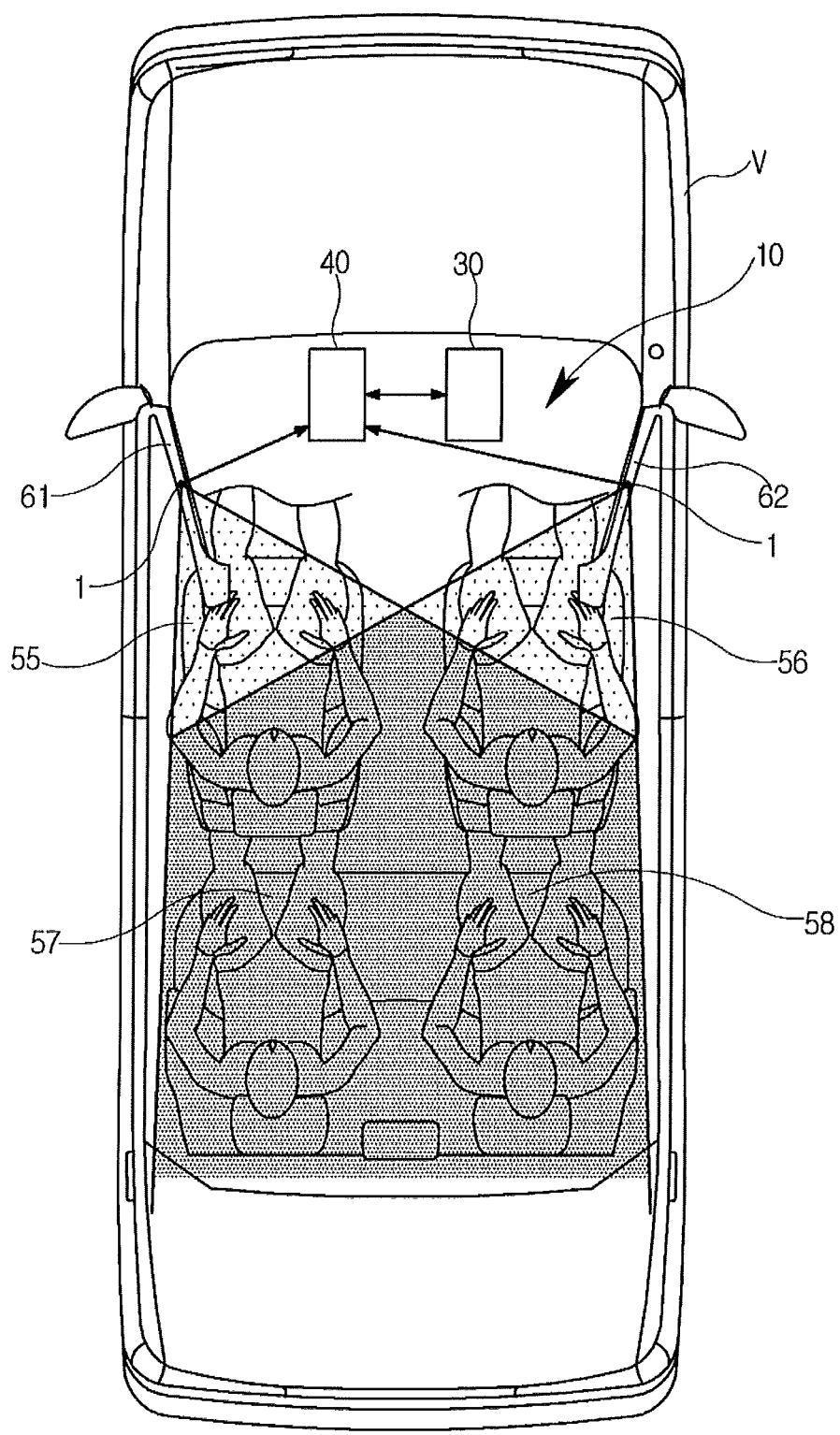
FIG. 9 is a schematic plan view of the interior of the vehicle illustrating a process of measuring temperature in a vehicle by the infrared sensor assembly according to the exemplary embodiment of the present invention.
Figure 10:
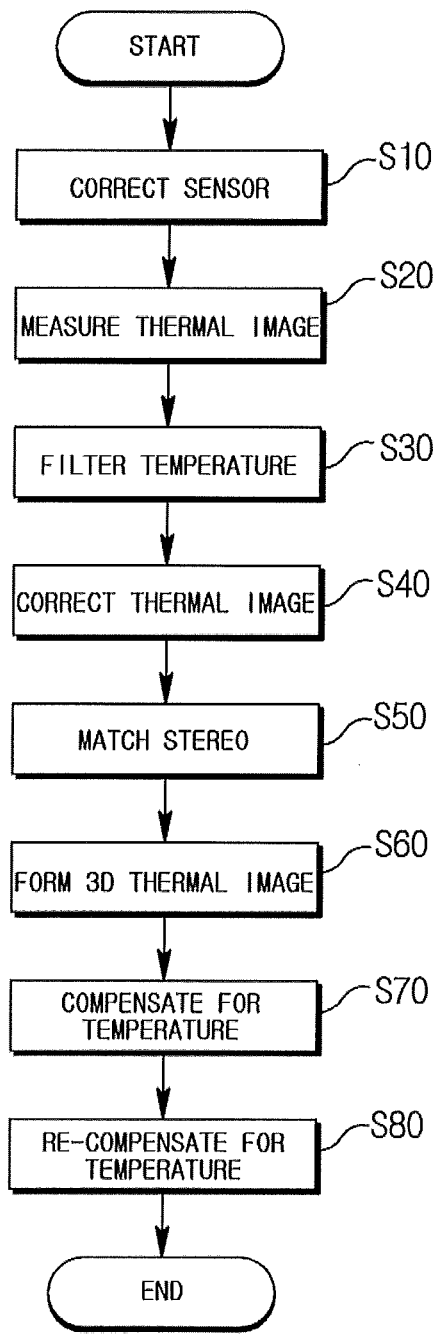
FIG. 10 is a flow chart illustrating a process of measuring a three-dimensional thermal image of the interior of the vehicle using the infrared sensor assembly according to the exemplary embodiment of the present invention.
Figure 11:
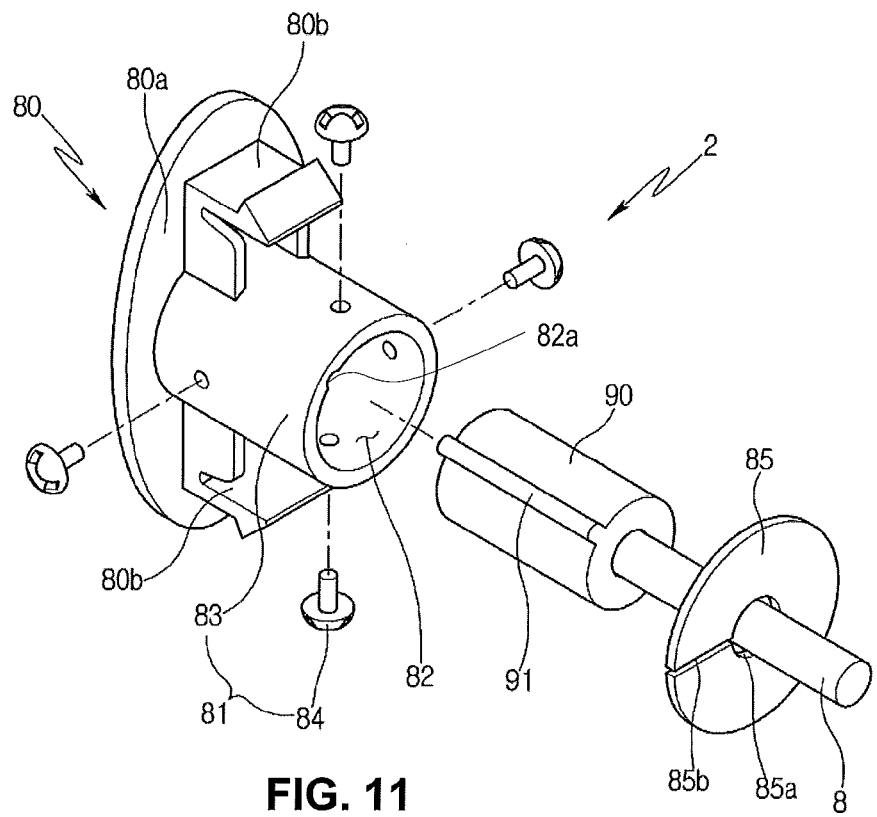
FIG. 11 is an exploded perspective view of main parts of an infrared sensor assembly according to another exemplary embodiment of the present invention.
Figure 12:
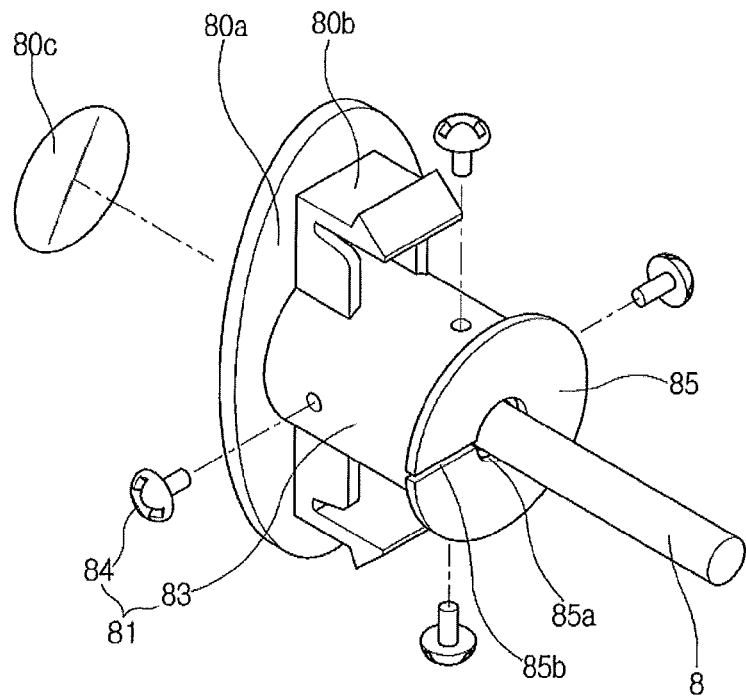
FIG. 12 is a diagram illustrating a coupled state between the main parts of the infrared sensor assembly illustrated in FIG. 9.

According to the infrared sensor assembly 1 in accordance with the exemplary embodiment of the present invention, for example, as illustrated in FIGS. 4 and 9, when the infrared sensor assembly 1 is installed at a middle-lower end of the left and right A-pillars 61 and 62 forming a front corner portion in a vehicle V, the left infrared sensor assembly 1 may measure a thermal image of passengers who board front left and right seats 55 and 56 and a rear right sheet 58, while the right infrared sensor assembly 1 may measure a thermal image of passengers who board the front left and right seats 55 and 56 and a rear left seat 57. The reason is that the left infrared sensor assembly 1 is covered by a driver's seat and thus does not measure the thermal image of the passenger of the rear left seat 57 and the right infrared sensor assembly 1 is covered by a passenger seat and thus does not measure the thermal image of the passenger who boards the rear right seat 58.

Meanwhile, each infrared sensor 9 determines the binding angle C of the main PCB 7 depending on the photographing angle B illustrated in FIGS. 4 and 8 and the installation inclined angle A of the infrared sensor assembly 1, that is, the support bracket 3 and is embedded in the casing 5 to be installed inside the A-pillars 61 and 62, thereby measuring the temperature in the vehicle without protruding to the outside of the A-pillars 61 and 62.

Therefore, even when a vehicle model to be applied is changed, the infrared sensor assembly 1 in accordance with the exemplary embodiment of the present invention may be smoothly applied only by adjusting the length or the width of the support bracket depending on the internal structure of the A-pillars 61 and 62, the binding angle of the warpage prevention bracket 11 for the main PCB 7 with the infrared sensor 9 depending on the photographing angle of the infrared sensor 9, and the profile of the outer surface of the cover 13.

As described above, when the infrared sensor assemblies 1 are installed in the left and right A-pillars 61 and 62, an operator 30 illustrated in FIG. 9 operates 2D thermal images measured by each infrared sensor 9 and a controller 40 correct the operated 2D thermal image to form 3D thermal images. As described above, a process of forming a 3D thermal image includes measuring a thermal image (S20), filtering temperature (S30), correcting a thermal image (S40), matching stereo (S50), compensating for temperature (S7), and re-compensating for temperature (S80).

Here, first, the correcting of the sensor (S10) is correcting a distortion of the thermal image which is measured by the infrared sensor 9. In the correcting of the sensor (S10), like using a monochrome checked board to correct a distortion of an optical image, the temperature is measured while a position of a correction plate in which cooling and warming areas are alternately disposed like the checked pattern is changed to various postures at a predetermined distance and then calibration is performed by a general optical calibration method using the measured thermal image information to extract a calibration matrix.

Next, the measuring of the thermal image (S20) is measuring the thermal image in the vehicle by the stereo infrared sensor 9 which is calibrated in the correcting of the sensor (S10). In the measuring of the thermal image (S20), each sensor 9 measures the thermal image for the same point on a virtual coordinates configured in the vehicle to form each 2D thermal image.

Next, the filtering of the temperature (S20) is removing thermal afterimage and thermal dither or thermal image noise which is generated in the thermal image measured in the measuring of the thermal image (S20). In the filtering of the temperature, the quality of the thermal image is improved and for example, the quality of the thermal image is improved by removing noise by various methods such as removing fixed pattern noise from the thermal image noise output from the infrared sensor 9.

To be continued, the correcting of the thermal image (S40) is correcting the thermal image measured in the measuring of the thermal image (S20) depending on characteristic values of calibration of the infrared sensor 9 acquired in the correcting of the sensor (S10). In the correcting of the thermal image (S40), rectification is performed on the thermal image corrected by using the calibration characteristic values obtained in the correcting of the sensor (S10), that is, the calibration matrix.

Here, the rectification on the thermal image is a process of satisfying an epipolar constraint of the thermal image measured by each of the left and right infrared sensors 9 and depending on the epipolar constraint, when the optical axes of the stereo sensor 9 is parallel with each other, one point of the thermal image measured by the one side sensor 3 corresponds to one point of the thermal image measured by the other side sensor 4. In this case, a line connecting the two corresponding points is referred to as an epipolar line.

Next, the matching of the stereo (S50) is obtaining coordinate disparity between corresponding points of each thermal image by comparing the respective thermal images corrected in the correcting of the thermal image (S40). In the matching of the stereo (S50), any one of the thermal images measured by the stereo sensor 9 is referenced, another thermal image is set as a target, and then a position within the thermal image of a specific pixel projected onto the reference thermal image and the targeted thermal image is obtained at a specific point on the virtual coordinates in the vehicle. Then, the disparity is finally acquired by obtaining the difference on the thermal image coordinates between the respective thermal images obtained as described above.

Next, the forming of the 3D thermal image (60) acquires the 3D thermal image by imaging and mapping the coordinate disparity of the thermal image obtained in the matching of the stereo (S50). In the forming of the 3D thermal image (60), the 3D thermal image is obtained from the respective thermal images based on, for example, a stereo image matching method among several methods of obtaining the 3D information from the 2D image. To this end, the disparity obtained in the matching of the stereo (S50) is calculated for each pixel of the reference thermal image and thus is stored as one image form to form a disparity map. Next, the 3D thermal image may be finally obtained by generating a plurality of disparity maps depending on a change in various viewpoints by repeating the above process and combining the plurality of generated disparity maps.

Meanwhile, the compensating for temperature (S70) is removing a deviation depending on a distance difference from each sensor 9 for the 3D thermal image obtained in the forming of the 3D thermal image (S60) and removes a temperature difference occurring depending on a difference in distance which reaches each sensor 9 at a specific coordinate in the vehicle corresponding to the specific point on the 3D thermal image.

Meanwhile, the re-compensating of the temperature (S80) is finally determining the 3D thermal image. As illustrated in FIG. 6, in the re-compensating of the temperature (S80), the temperature difference due to the distance difference between the left and right sensors 9, passing through the compensating of the temperature (S70) is removed and then the deviation due to a material of an object of which the temperature is measured is finally re-compensated. To this end, in the re-compensating for temperature (S80), the temperature value of the 3D thermal image from which the temperature difference depending on the distance difference between the left and right sensors 9 is removed in the compensating (S70) is re-compensated in consideration of unique emissivity for each material of vehicle members for each coordinate which is previously understood and stored depending on the coordinate information in the vehicle, that is, a seat, a ceiling, glass or unique emissivity for each body portion of a passenger. In this case, as the unique emissivity of each temperature measurement portion, an ideal body such as a black body is 1, a human body is 0.95, glass is 0.5, and a ceiling is 0.8

Hereinafter, an infrared sensor assembly for measuring temperature in a vehicle according to another exemplary embodiment of the present invention will be described with reference to FIGS. 11 to 15 and a portion of FIGS. 4 to 10 and the description of the common portion of the exemplary embodiment of the present invention described above will be omitted. In an infrared sensor assembly 2 for measuring temperature in a vehicle according to another exemplary embodiment of the present invention, as the support means, an installation groove 70 formed in the A-pillars 61 and 62 in the vehicle is applied and as the commonness means, there are the cap casing 80 mounted in the installation groove 70 and the sensor fixture 90 receiving and fixing the infrared sensor 8 and installed in the cap casing 80 at various angles.

The infrared sensor assembly according to another exemplary embodiment of the present invention is configured to be installed at one side of various garnishes forming an interior of the vehicle to measure the temperature in the vehicle and for example, as illustrated in FIG. 4, may be installed in the left and right A-pillars 61 and 62 which are positioned at left and right corners of a front surface in the vehicle. This is to keep the infrared sensor assembly 2 far away from a passenger which is a temperature measuring target if possible. As such, the reason for keeping an interval between the infrared sensor assembly 2 and the passenger far away from each other is to secure a photographing range as wide as possible only by an infrared sensor using a narrow angle lens which is cheap but has a narrow viewing angle.

In the infrared sensor assembly 2 according to another exemplary embodiment of the present invention which is installed at the front surface in the vehicle to measure the temperature in the vehicle, as illustrated in FIGS. 11 to 15, the support means is the installation groove formed in an A-pillar 162 in the vehicle, the commonness means may be mounted in the installation groove and may include a cap casing 80 configured to include an angle control mechanism 81 installed to control an angle of the infrared sensor and a sensor fixture 90 configured to receive and fix the infrared sensor 8 so that the infrared sensor 8 is indirectly installed in the angle control mechanism 81 and be installed in the angle control mechanism 81 at various angles, preferably, further includes a receiving body cover 85.

Figure 15:
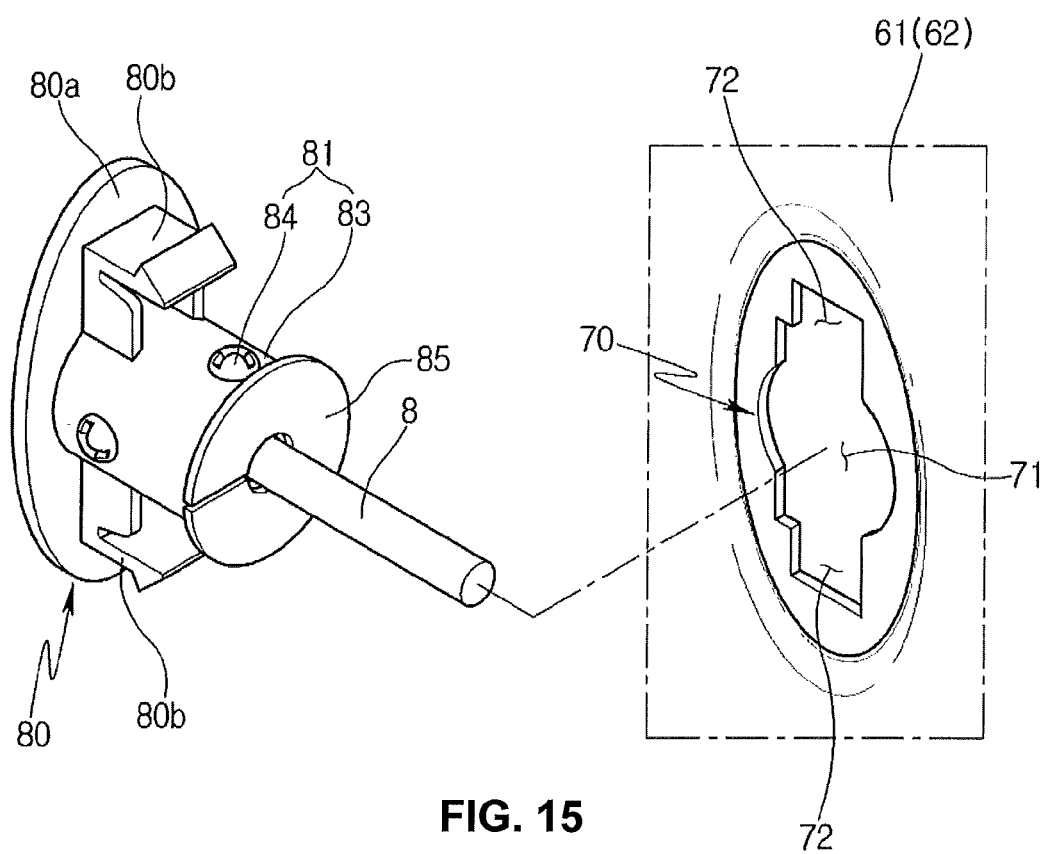
FIG. 15 is a diagram illustrating an installation structure between the cap casing of the infrared sensor assembly according to another exemplary embodiment of the present invention and an installation groove formed in an A-pillar of the vehicle.

Here, the installation groove 70 is a base to make the infrared sensor assembly 2 detachably be mounted on an inner surface of the garnish in the vehicle and as illustrated in FIG. 15, may help mount the infrared sensor assembly 2 at a desired position independent of a shape or a dimension of an inside of the corresponding garnish, that is, the garnish of the A-pillars 61 and 62 as illustrated.

To this end, as illustrated in FIG. 15, the installation groove 70 has a shape which lengthily extends up and down and has a main groove 71 configured to be positioned at a central portion thereof and sub grooves 72 of sub upper side and lower side extending up and down from the main groove 71.

The cap casing 80 has a body 80a which has a plate shape and is exposed outside the A-pillars 61 and 62 and the angle control mechanism 81 which is positioned at one side of the body 80a to control the angle of the infrared sensor 8.

Here, an inner side of the body 80a, that is, a side contacting the A-pillars 61 and 62 is vertically provided with a pair of combinations 80b which is elastically combined and locked to the sub groove 72 of the installation groove 70. Further, the body 80a may be provided with a transmission window 80c for protecting the infrared sensor 8 and the transmission window 80c may be integrally formed with the body 80a by a double injection molding method, and the like, depending on the manufacturing process.

Meanwhile, the angle control mechanism 81 includes a pipe-shaped receiving body 83 configured to form a receiving groove 82 in which the sensor fixture 90 is received and at least two angle control screws 84 configured to penetrate from an outer side of the receiving body 83 toward an inner side thereof to fix the sensor fixture received in the receiving groove 82 at various angles.

Here, the receiving groove 82 may be formed in a circular shape as illustrated and the sensor fixture 90 may be formed in a cylindrical shape corresponding to the shape of the receiving groove 82.

Further, the angle control screws 84 may be disposed at a circumference of the receiving body 83 at an equal interval along a circumferential direction and disposed in pair in a direction opposite to each other, and the angle control screws 84 each formed in pair may be disposed to be spaced apart from each other at a predetermined distance along a length direction of the receiving body.

Figure 13:
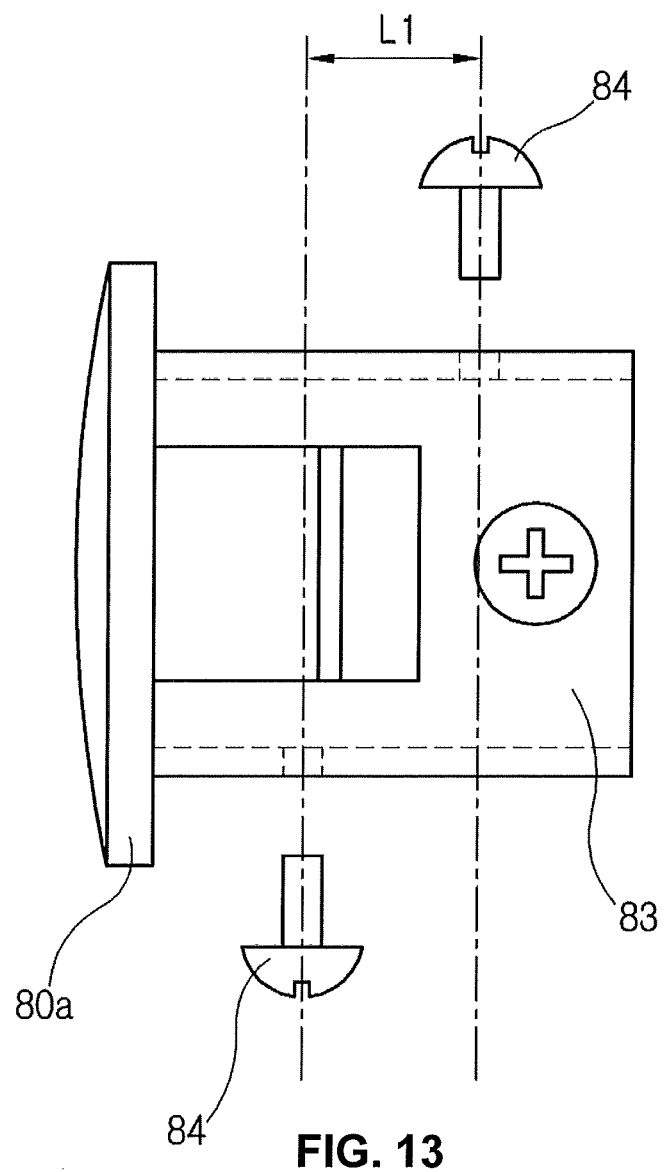
FIG. 13 is a plan view illustrating a cap casing of the infrared sensor assembly illustrated in FIG. 10.
Figure 14:
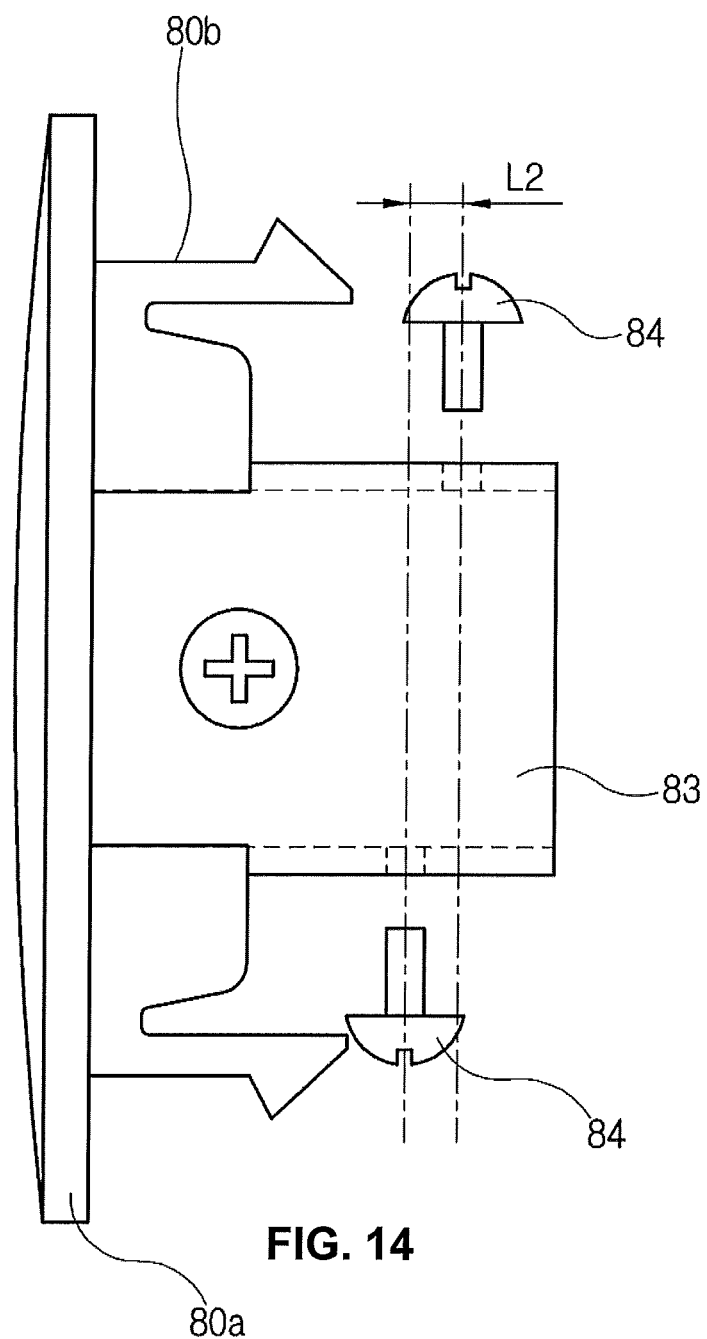
FIG. 14 is a side view illustrating the cap casing of the infrared sensor assembly illustrated in FIG. 10.

For example, as illustrated in FIG. 13, when viewed the receiving body 83 from a side, the angle control screws 84 which are each positioned at upper and lower portions of the receiving body 83 among the angle control screws 84 and are formed in pair may be disposed along a length direction of the receiving body 83 to be spaced apart from each other at a predetermined distance L1 and as illustrated in FIG. 14, when viewed the receiving body 83 from the top, the angle control screws 84 which are each positioned at left and right sides of the receiving body 83 among the angle control screws 84 and are formed in pair may be disposed along the length direction of the receiving body 83 to be spaced apart from each other at a predetermined distance L2.

As such, the angle control screws 84 formed in pair are disposed along the length direction of the receiving body 83 to be spaced apart from each other and thus the sensor fixture 90 may be fixed along an up and down direction and a left and right direction at various angles depending on how much each of the angle control screws 84 is tightened and when the number of angle control screws 84 is increased, the sensor fixture 90 may be fixed along various directions present between the up and down directions and the left and right directions at various angles. Therefore, the infrared sensor 8 which is fixed to the sensor fixture 90 may also be fixed at various angles.

The sensor fixture 90 is configured to receive and fix the infrared sensor 8 so that the infrared sensor 8 is indirectly installed in the angle control mechanism 81 and may be provided with the groove in which the infrared sensor 8 is received and fixed and as illustrated, may be formed in a cylindrical shape. The sensor fixture 90 is installed at the angle control mechanism 81 at various angles in the state in which the sensor fixture 90 receives and fixes the infrared sensor 8.

Meanwhile, an outer circumference of the sensor fixture 90 may be provided with an installation direction fixing protrusion 91 to confirm an installation direction following the circumferential direction of the receiving groove 82 when the sensor fixture 90 is received in the receiving groove 82 and the receiving groove 82 may be provided with an installation direction fixing groove 82a corresponding to the installation direction fixing protrusion 91.

Meanwhile, a viewing angle of the infrared sensor 8 is widened as the infrared sensor 9 is positioned at lower ends of the A-pillars 61 and 62 within the limited space of the vehicle. Therefore, in order to widen the viewing angle of the infrared sensor 9 if possible, the installation groove 70 may be installed at the lower ends of the A-pillars 61 and 62.

Meanwhile, the infrared sensor assembly for measuring temperature in a vehicle according to another exemplary embodiment of the present invention may further include a receiving body cover 85 configured to cover the receiving groove 82 of the receiving body 83 and have a central portion provided with a through hole 85a through which a portion of the infrared sensor 8 indirectly installed in the receiving body 83 penetrates by the sensor fixture 90.

Here, the receiving body cover 85 may be provided with a cut part 85b configured to communicate with the through hole 85a so as to secure a smooth motion of the infrared sensor 8 penetrating through the through hole 85a at the time of installing the infrared sensor 8.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

According to the infrared sensor assembly for measuring temperature in a vehicle in accordance with the exemplary embodiments of the present invention, it is possible to compact the overall size of the infrared sensor assembly by inclinedly binding the infrared sensor assembly for measuring temperature in a vehicle on the main PCB together with the warpage prevention bracket.

Therefore, it is possible to more improve the aesthetic of the interior of the vehicle since the infrared sensor may be embedded in the garnish of the interior material of the vehicle such as the A-pillar.

Further, it is possible to maintain the optimal temperature measuring performance by adjusting the length or the width of the support bracket depending on the internal structure of the garnish in the vehicle such as the A-pillar and change the binding angle of the infrared sensor and changing the binding angle of the infrared sensor depending on the photographing angle of the infrared sensor even though the vehicle model to which the infrared sensor assembly is applied is changed, and at the same time, promote the smooth commonness of the infrared sensor assembly only by performing the adjustment to make the profile of the outer surface of the cover coincide with the embedded plane profile of the corresponding interior material such as the A-pillar.

According to the infrared sensor assembly for measuring temperature in a vehicle in accordance with the exemplary embodiments of the present invention, it is possible to compact the overall size of the infrared sensor assembly since the infrared sensor assembly for measuring temperature in a vehicle is installed in the cap casing at various angles by the plurality of angle control screws and the cap casing is installed in the installation groove formed the A-pillar.

Therefore, it is possible to more improve the aesthetic of the interior of the vehicle since the infrared sensor may be embedded in the garnish of the interior material of the vehicle such as the A-pillar.

Further, it is possible to maintain the optimal temperature measuring performance and promote the smooth commonness of the infrared sensor assembly by changing the binding angle of the infrared sensor even though the vehicle model to which the infrared sensor assembly is applied and thus the angle of the A-pillar is changed.

What is claimed is:

1. An infrared sensor assembly for measuring a temperature in a vehicle, the sensor assembly comprising:
    a support means configured for installation in a garnish of one side of a vehicle; and
    a commonness means configured for installation in the support means to control an installation angle of an infrared sensor for measuring a temperature in the vehicle, wherein the commonness means comprises a main PCB and a warpage prevention bracket at least partially surrounding the infrared sensor, the warpage prevention bracket inclinedly attached to the main PCB, and wherein the infrared sensor is inclinedly oriented with respect to the main PCB.

2. The infrared sensor assembly of claim 1, wherein the support means is a support bracket installed in an A-pillar of the vehicle.

3. The infrared sensor assembly of claim 2, wherein the commonness means includes a casing configured for mounting in the support bracket, wherein an internal installation space is formed between the casing and the support bracket.

4. The infrared sensor assembly of claim 3, wherein a PCB housing is interposed between the support bracket and the casing and the main PCB is configured for insertion into the PCB housing.

5. The infrared sensor assembly of claim 4, wherein the warpage prevention bracket at least partially encloses a terminal of the infrared sensor to prevent warpage of the terminal.

6. The infrared sensor assembly of claim 2, wherein the support bracket is detachably installed in the A-pillar of the vehicle.

7. The infrared sensor assembly of claim 2, wherein the support bracket is installed at a lower end of the A-pillar with respect to a direction of gravity.

8. An infrared sensor assembly for measuring a temperature in a vehicle, the sensor assembly comprising:
    a support means configured for installation in a garnish of one side of a vehicle, wherein the support means is an installation groove formed in an A-pillar of the vehicle; and
    a commonness means configured for installation in the support means to control an installation angle of an infrared sensor for measuring a temperature in the vehicle, wherein the commonness means is mounted in the installation groove and includes a cap casing and a sensor fixture, the cap casing including an angle control mechanism configured to control an angle of the infrared sensor and the sensor fixture configured to receive the infrared sensor therein.

9. The infrared sensor assembly of claim 8, wherein the angle control mechanism includes a pipe-shaped receiving body forming a receiving groove for receiving the sensor fixture therein.

10. The infrared sensor assembly of claim 9, wherein at least two angle control screws penetrate the receiving body and are configured to fix the sensor fixture within the receiving groove at various angles.

11. The infrared sensor assembly of claim 10, wherein the receiving groove has a substantially cylindrical shape and the at least two angle control screws are disposed about a circumference of the receiving body with equal intervals formed therebetween in the circumferential direction of the receiving groove.

12. The infrared sensor assembly of claim 11, wherein a first one of the at least two angle control screws is disposed in a direction opposite of a second one of the at least two angle control screws, the first one of the at least two angle control screws spaced apart from the second one of the at least two angle control screws along a length direction of the receiving body.

13. The infrared sensor assembly of claim 9, wherein an outer surface of the sensor fixture includes an installation direction fixing protrusion and the receiving groove of the receiving body includes an installation direction fixing groove corresponding to the installation direction fixing protrusion.

14. The infrared sensor assembly of claim 9, further comprising a receiving body cover configured to cover the receiving groove of the receiving body, the receiving body cover having a through hole through which a portion of the infrared sensor penetrates past the sensor fixture.

15. The infrared sensor assembly of claim 14, wherein the receiving body cover is provided with a cut part configured to communicate with the through hole and be at least partially aligned with the through hole.

16. The infrared sensor assembly of claim 8, wherein the installation groove is installed in a lower end of the A-pillar in a direction of gravity.

* * * * *